United States Patent
Chana et al.

(10) Patent No.: US 9,253,069 B2
(45) Date of Patent: Feb. 2, 2016

(54) METHOD AND SYSTEM FOR TESTING CONFIGURATION OF ENVIRONMENTS

(75) Inventors: Mandeep Singh Chana, London (GB); James Grafton, London (GB); Stephen Milne, London (GB); Andrew Craig Stevenson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 13/420,529

(22) Filed: Mar. 14, 2012

(65) Prior Publication Data

US 2012/0191404 A1     Jul. 26, 2012

Related U.S. Application Data

(63) Continuation of application No. 12/777,360, filed on May 11, 2010, now abandoned.

(30) Foreign Application Priority Data

Nov. 9, 2009 (EP) .................................. 09175366

(51) Int. Cl.
   *H04L 12/28*     (2006.01)
   *H04L 12/26*     (2006.01)
   *G06F 11/36*     (2006.01)

(52) U.S. Cl.
CPC ............ *H04L 43/12* (2013.01); *H04L 12/2697* (2013.01); *H04L 43/50* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 5,864,674 A * | 1/1999 | Goldman et al. | 709/221 |
| 6,618,360 B1 | 9/2003 | Scoville et al. | 370/248 |
| 6,813,648 B1 * | 11/2004 | Perona et al. | 710/8 |
| 7,254,745 B2 * | 8/2007 | Briskey et al. | 714/27 |
| 2004/0237077 A1 | 11/2004 | Cole et al. | 717/162 |
| 2005/0197990 A1 * | 9/2005 | Wu et al. | 706/48 |
| 2005/0271047 A1 * | 12/2005 | Huonder et al. | 370/389 |
| 2007/0230486 A1 | 10/2007 | Zafirov | 370/401 |
| 2010/0135164 A1 | 6/2010 | Rofougaran | 370/248 |
| 2011/0145649 A1 * | 6/2011 | Nilsson et al. | 714/38.1 |

OTHER PUBLICATIONS

Office Action for U.S. Appl. No. 12/777,360 (Chana et al., "Method and System for Testing Configuration of Enviroments," filed May 11, 2010), U.S. Patent and Trademark Office, mailed Jul. 19, 2012, 14 pages.

Cottrell et al., "Network Monitoring Tools," Stanford Linear Accelerator Center, May 2009, 28 pages.

* cited by examiner

*Primary Examiner* — Minh-Trang Nguyen
(74) *Attorney, Agent, or Firm* — VanLeeuwen & VanLeeuwen; William J. Stock

(57) ABSTRACT

A method for testing configuration of environments is provided. A probe for connection to a network and/or devices interacts to launch a configuration analyzer tool. The configuration analyzer tool includes a test mechanism for running a set of tests for the probe relating to connectivity and configuration of attached networks and devices before connection and suggesting solutions to test results. The tests may be externalized and dynamically loaded at run time of the configuration analyzer tool.

24 Claims, 5 Drawing Sheets

METHOD AND SYSTEM FOR TESTING CONFIGURATION OF ENVIRONMENTS

RELATED APPLICATIONS

This application is a continuation of U.S. application Ser. No. 12/777,360, filed May 11, 2010, titled "Method and System for Testing Configuration of Environments," which is based on and claims the benefit of priority from European Patent Application EP 09175366.5, filed Nov. 9, 2009.

BACKGROUND

This invention relates to the field of testing system environments. In particular, the invention relates to testing configuration of system environments.

Service level management (SLM) systems are known that collect event information from many different network data sources and present a simplified view of this information to operators and administrators. For example, IBM Tivoli Netcool/OMNIbus (IBM, Tivoli, Netcool/OMNIbus are trade marks of International Business Machines Corporation) is an event management product which collects enterprise-wide event information, and CA Spectrum (CA Spectrum is a trade mark of CA, Inc.) is a network infrastructure management product.

SLMs have object servers to which alert information is forwarded from integrations products which are software interfaces between network managers and the endpoints which are being managed. Integrations products are external programs, such as probes, monitors, and gateways. For example, probes connect to an external source, detect and acquire event data, and forward the data to the object server as alerts.

The alert information is stored and managed at the object server in database tables and displayed in an event list.

Integrations product sets such as probes and gateways often give rise to reported problems related to configuration issues. If a customer tries to run an integration product in a mis-configured system environment, it will fail to launch with little or misleading information regarding why it failed.

SUMMARY

An embodiment of the invention is a method for testing configuration of environments, including executing a probe for connection to a network and/or devices, launching a configuration analyser tool from the probe, and running a set of tests for the probe relating to connectivity and configuration of attached networks and devices before connection. The executing, launching, and running may be implemented in computer hardware configured to perform the executing, launching, and running, or in computer software embodied in a non-transitory, tangible, computer-readable storage medium.

In one embodiment, the method includes dynamically loading externally stored tests at run time of the configuration analyser tool.

BRIEF DESCRIPTION OF THE DRAWINGS

The subject matter regarded as the invention is particularly pointed out and distinctly claimed in the concluding portion of the specification. The disclosure, both as to organization and method of operation, together with objects, features, and advantages thereof, may best be understood by reference to the following detailed description when read with the accompanying drawings in which:

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the disclosure. However, it will be understood by those skilled in the art that the present invention may be practiced without these specific details. In other instances, well-known methods, procedures, and components have not been described in detail so as not to obscure the present disclosure.

A method and system are described to provide a flexible solution to mis-configuration problems in integration products. The method and system run tests and suggest resolutions for most of the basic configuration issues that are encountered by customers on a regular basis. This allows customers to self-diagnose and fix issues within their environment. This also produces detailed output suitable for feedback to support engineers which can dramatically decrease the turnaround times for issues when they do arise.

The method and system for testing configuration of environments are described in the context of event management integration products. However, the method and system may be used as a generic testing framework in other applications, for example, in automated test harness frameworks, and automated software fault diagnosis and repair.

Figure 1A:
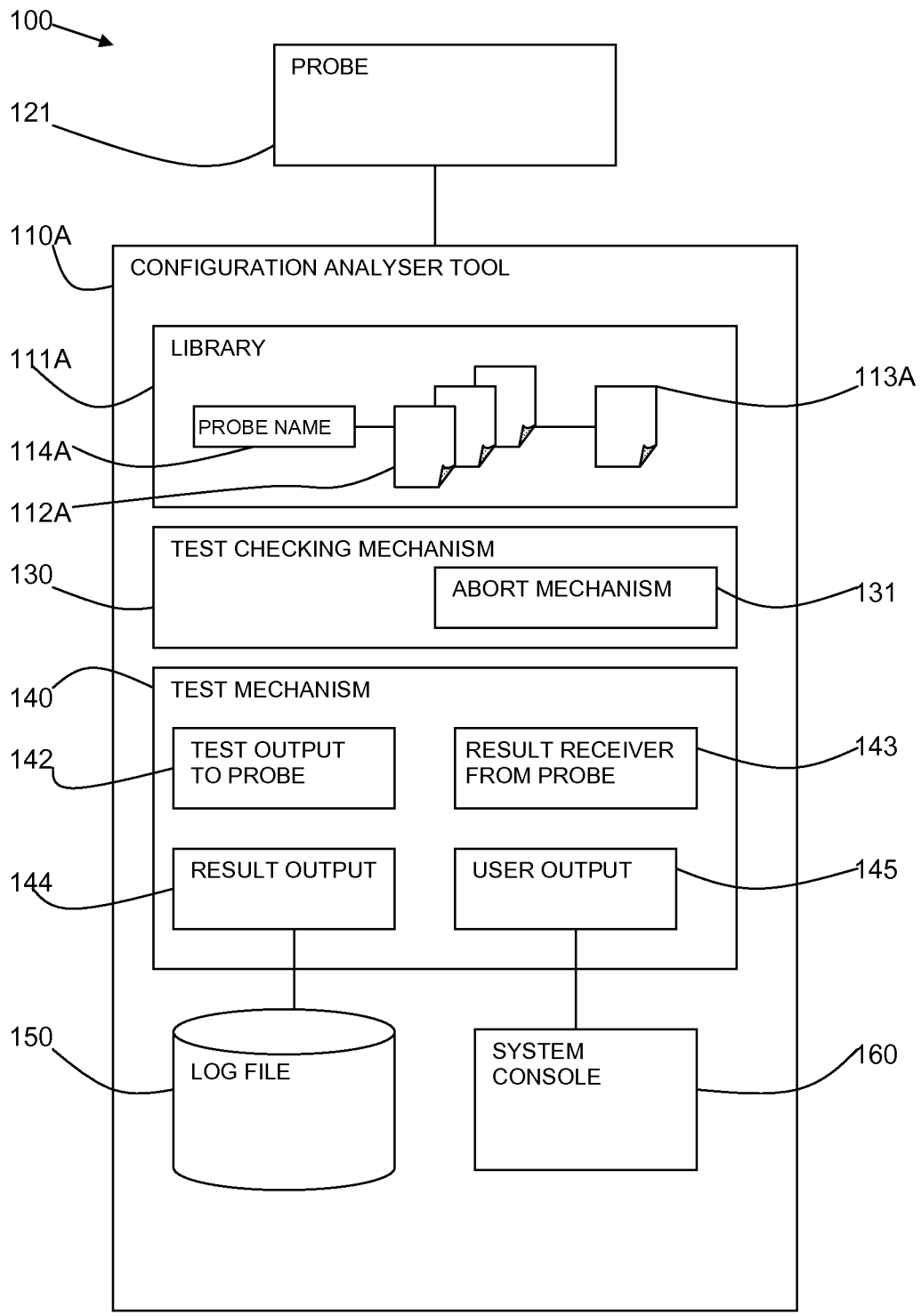
FIG. 1A is a block diagram of an embodiment of a system in accordance with the present invention.

Referring to FIG. 1A, a system 100 is shown including a configuration analyser tool 110A. The configuration analyser tool 110A interfaces with a probe 121.

Probes 121 are external programs which provide alert information for systems, such as service level management (SLM) systems or event management systems, that collect event information from many different network data sources. Probes 121 may include integration probes, monitors, gateways, data collectors, event collectors, etc. Probes 121 typically connect to an external source to detect and acquire event data, and forward the data to an object server as alerts.

A described probe 121 is provided with an associated diagnostic configuration analyser tool 110A that checks for connectivity and configuration before connecting both with the event management system and the network or network device. If there is a problem, then the probe 121 will not connect and will wait or hang.

The configuration analyser tool 110A is executed against a probe 121 and is launched by a probe 121 requiring a configuration test. The configuration analyser tool 110A includes a library or jar 111A of probe names 114A and associated test files 112A of tests to be run and a suggestions file 113A of suggested problems for troubleshooting.

The configuration analyser tool 110A includes a test checking mechanism 130 which checks the test files' 112A syntax before using the test files. The test checking mechanism 130 includes an abort mechanism 131 to abort the test if an error is found.

The configuration analyser tool 110A includes a test mechanism 140 including establishing a log file 150 for a test. The test mechanism 140 includes a test output 142 for outputting the test to the probe 121 and a receiver 143 for the test results from the probe 121.

The test mechanism 140 runs through the test files 112A generating a result output 144 which outputs suggestions from the suggestions file 113A. The result output and suggestions are recorded and stored in the log file 150.

A user output 145 is provided to a system console 160 with an indication that all tests have completed successfully or that a user should check the log file 150 for problems with their environment and possible solutions.

A system console 160 lists tests which have been run and whether these were passed or failed. A user will often refer first to the system console 160 for test results. The log file 150 contains full diagnostic output that can be used for further analysis.

Figure 1B:
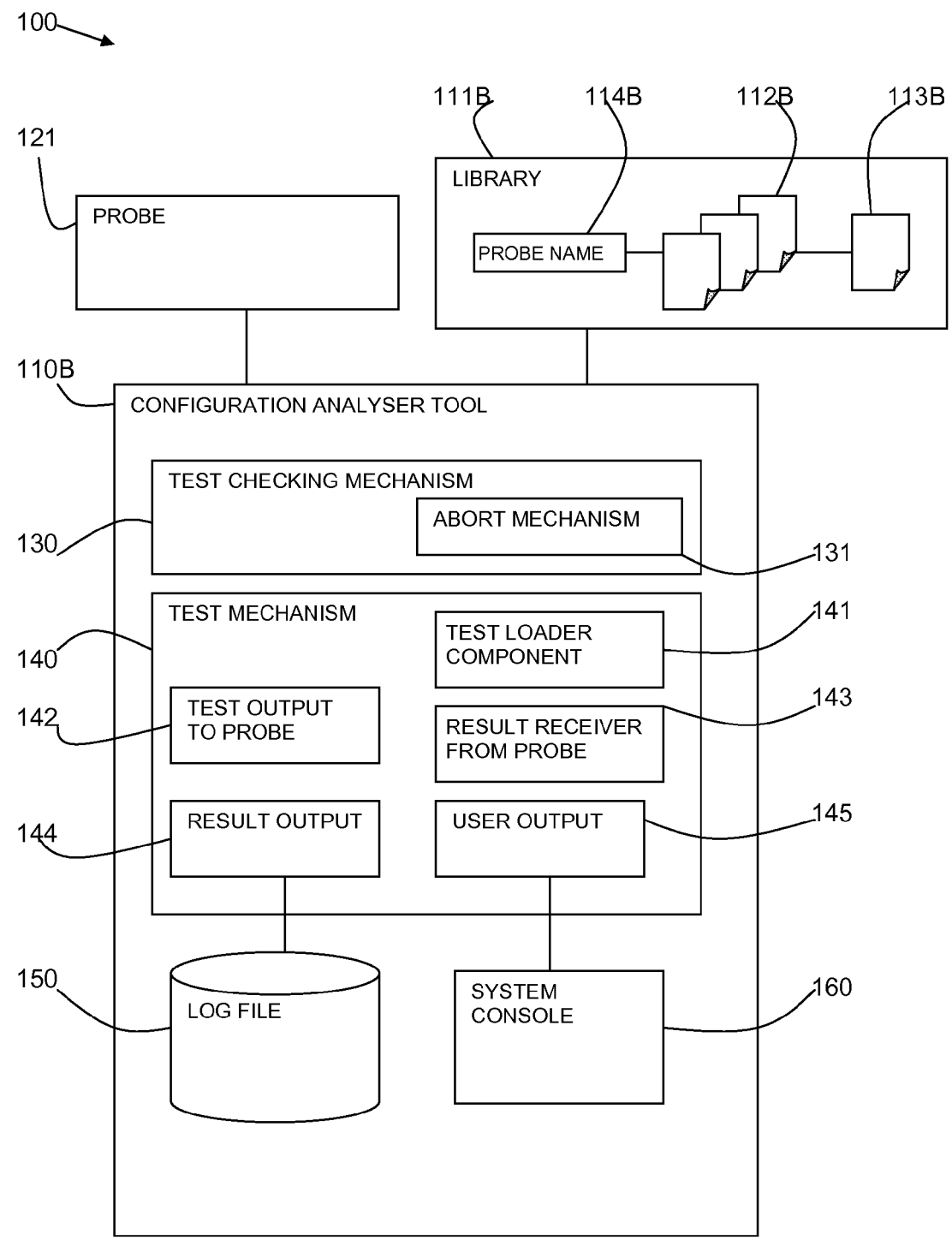
FIG. 1B is a block diagram of another embodiment of a system in accordance with the present invention.

FIG. 1B provides an alternative embodiment of a system 100B including a configuration analyser tool 110B interfacing with a probe 121.

In the system 100 of FIG. 1B, the tests are externalized from the configuration analyser tool 110B and dynamically loaded at run time. This allows the configuration analyser tool 110B to be flexible and create a completely modular based toolset. Each individual test is treated as a separate software module, allowing for finer grained control of the testing environment and dynamic updates of individual tests after the product is shipped.

The logic to run the tests and to interpret the tests may remain internal to the configuration analyser tool 110B. For example, the logic to run and interpret test XML (Extensible Markup Language), if the tests are this format, remains internal. The test files 112B, for example, in the form of the test XML and test Binaries, are externalized. The test files 112B may be stored in individual versioned JAR (Java Archive) (Java is a trade mark of Sun Microsystems, Inc.) files, allowing for fine grained test version control and ensuring there is no code duplication.

An external library 111B is provided with test files 112B and suggestions file 113B associated with probe names 114B. The external library 111B can be stored on a server for access via a network. The test mechanism 140 includes a test loader component 141 for loading the test files 112B and suggestions file 113B at run time of the test mechanism 140.

Figure 2:
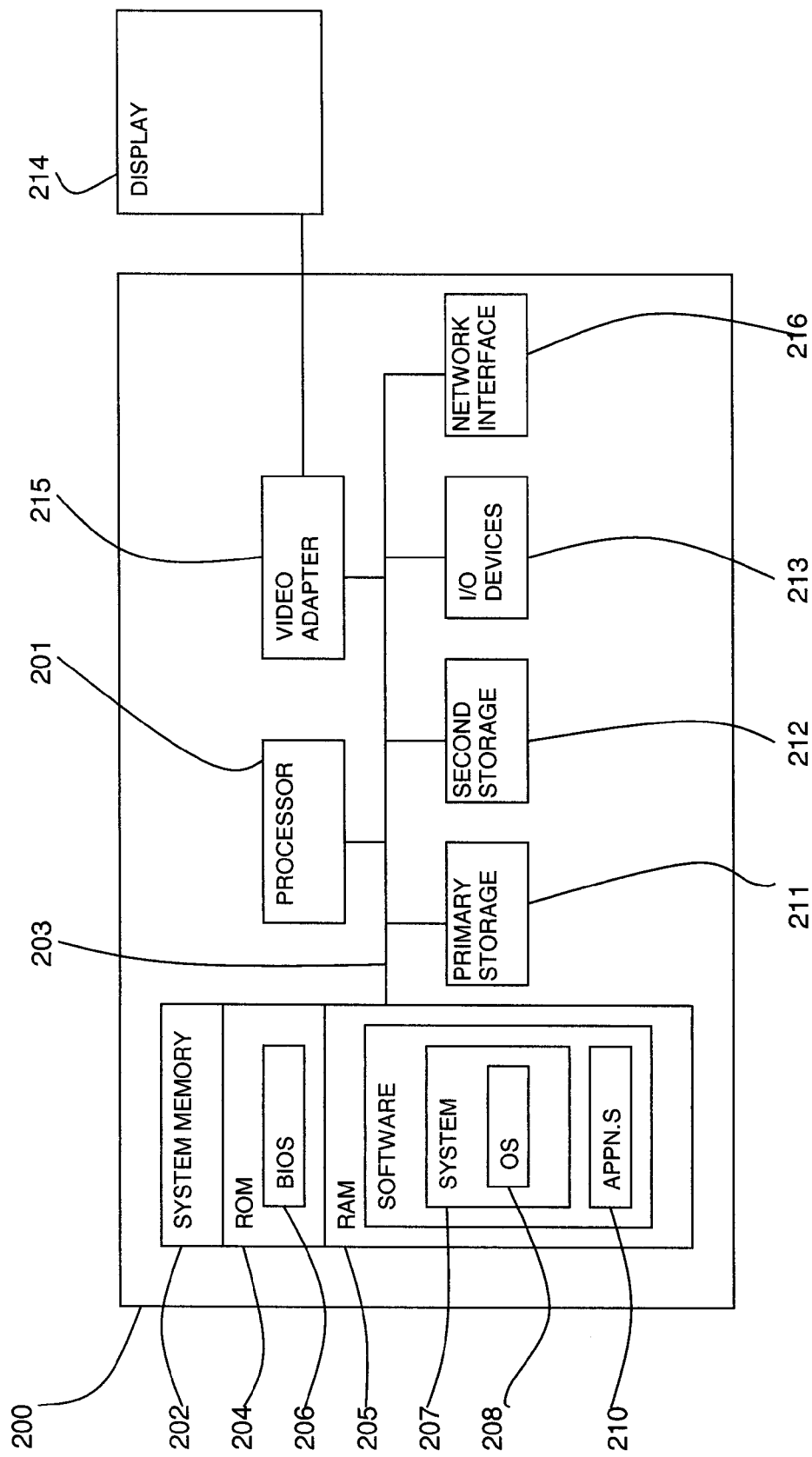
FIG. 2 is a block diagram of a computer system in which an embodiment of the invention may be implemented.

Referring to FIG. 2, an exemplary system for implementing an embodiment of the configuration analyser tool includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
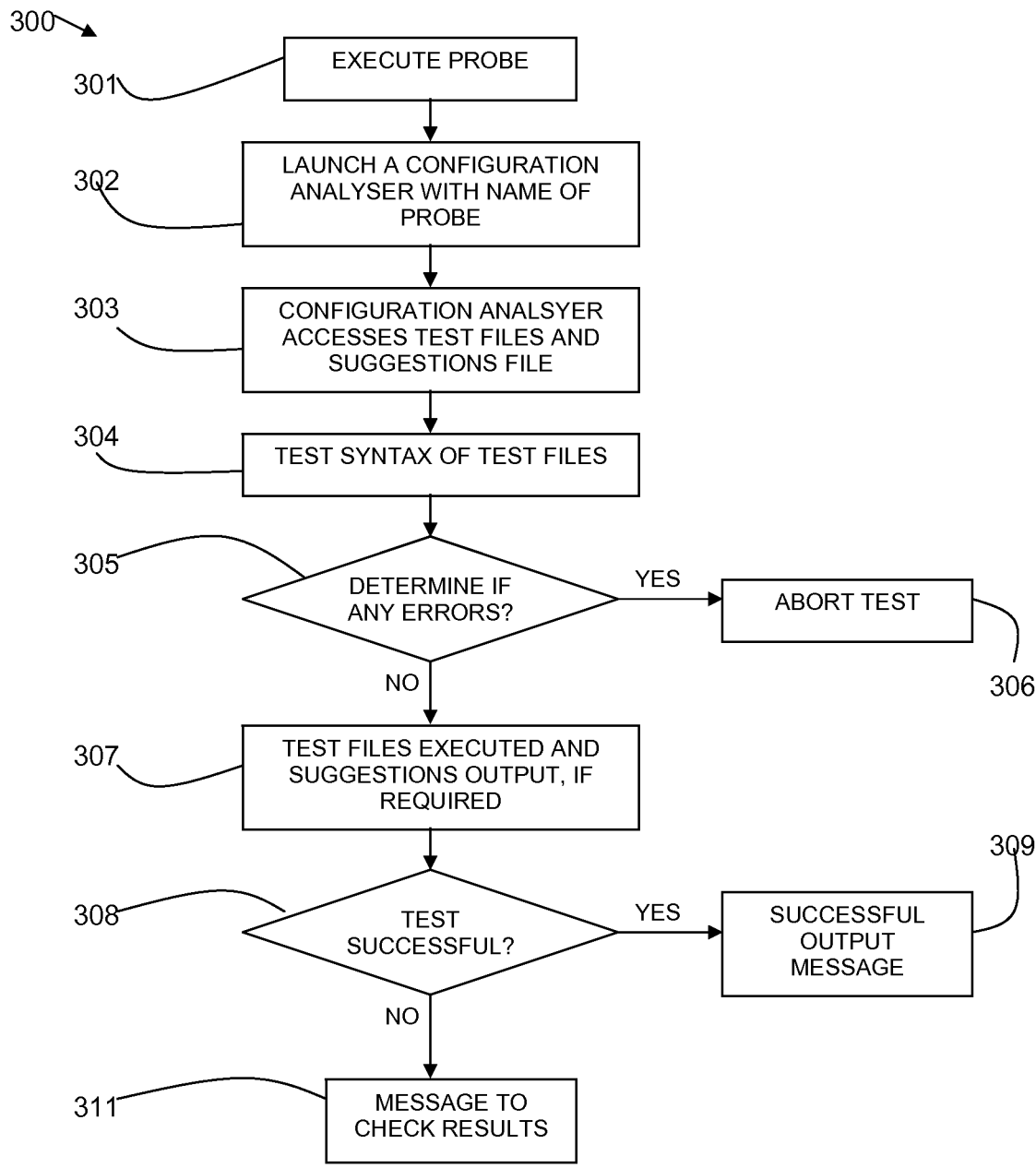
FIG. 3 is a flow diagram of an embodiment of a method in accordance with the present invention.

Referring to FIG. 3, a flow diagram 300 illustrates one embodiment of a method of testing configuration of environments.

A probe is executed 301 which launches 302 a configuration analyser with the name of the probe. The configuration analyser accesses 303 test files to be run and a corresponding suggestions file. In an embodiment in which the test files are externalized, the test files may be loaded at run time.

The test files are syntax tested 304 and it is determined 305 if there are any errors. If there are errors the testing is aborted 306. If there are no errors, the method continues.

The test files are executed 307 on the probe sequentially and suggestions are output from the suggestions file, where required. It is then determined 308 if the test have completed successfully. If so, a successful output message is provided 309. If not, an output message is provided 311 indicating the log file and/or system console should be checked for problems and possible solutions.

Figure 4:
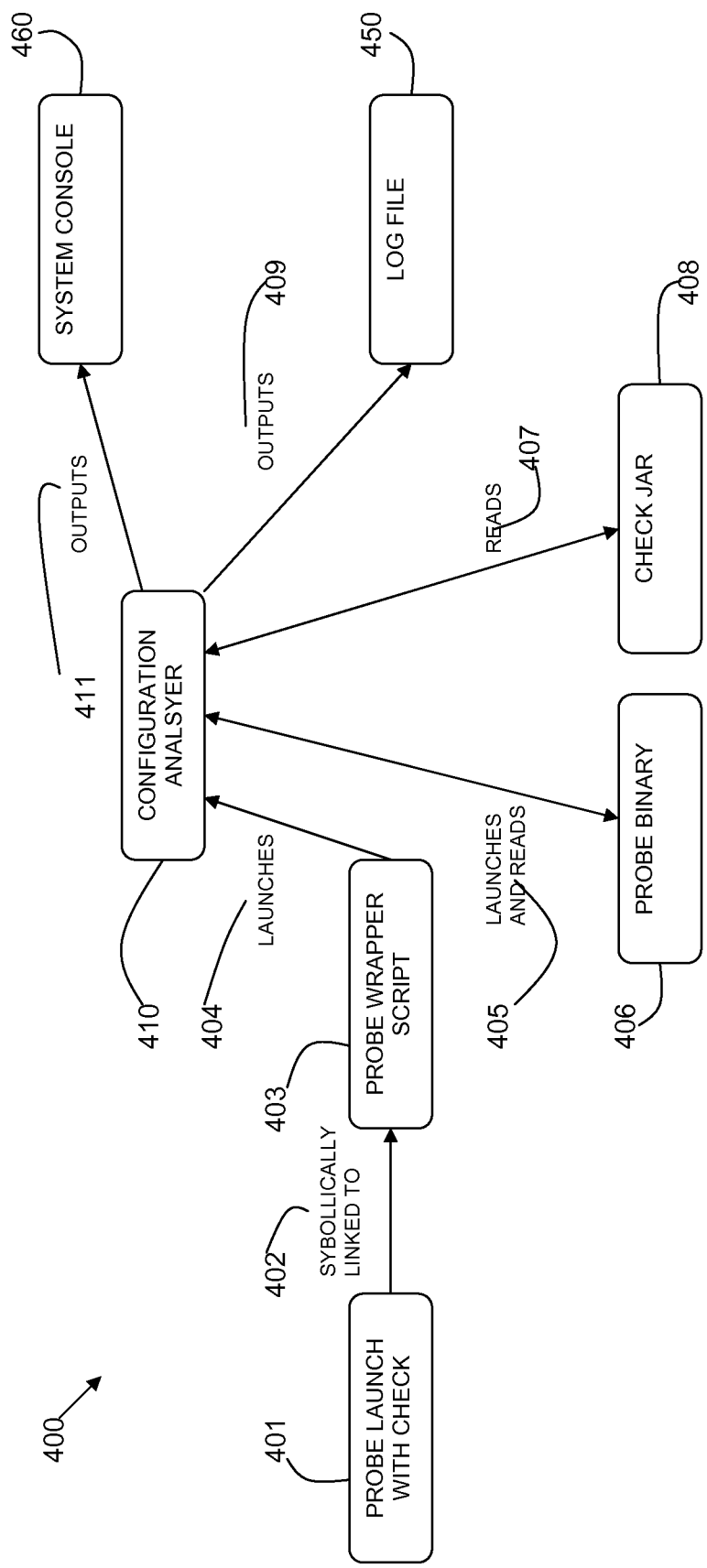
FIG. 4 is a schematic diagram of an embodiment of a method of the present invention.

Referring to FIG. 4, a schematic diagram illustrates the execution of a configuration analyser tool against a probe. In one embodiment, a Java-based modular framework is used for the configuration analyser tool to allow a flexible solution.

The probe is executed from the command line 401, with single or multiple arguments, one of them being "-check". This is symbolically linked 402 to a probe wrapper script 403 which will then automatically launch 404 the configuration analyser tool 410. The launch of the configuration analyser tool 410 includes the name of the probe "<probe_name>" as an argument and the probe's ".check.jar" which contains details of tests to be run as well as an internationalisation file of suggestions in the classpath.

The configuration analyser tool 410 starts and sets up the log file 450 "/logs/<probe_name>.check.log" and then runs 405 "-dumpprops" on the probe binary 406 and stores the output for use with the tests.

The configuration analyser 410 syntax checks the test file against "/<arch>/ConfigAnalyser.xsd". If any errors are found it will exit at this point.

The configuration analyser 410 proceeds to run sequentially through all the tests 407 detailed in the xml file inside "<probe_name>.check.jar" 408, outputting suggestions from the internationalised suggestions message file in that jar.

In an embodiment which includes externalised test files, the process does multiple reads and executes on external "Test Library' modules.

The configuration analyser 410 outputs detailed information 409 to the log file 450 "/logs/<probe_name>.check.log" and outputs summary information 411 to the system console 460.

Once all tests have been run, the configuration analyser 410 will output a message either saying all tests completed successfully or one that suggests customers check the log file 450 and/or system console 460 for problems with their environment problems and possible solutions.

The tests verify the connectivity with an event management system and connectivity with the network before attempting to make a connection. Any problems are documented in a log file.

The tests may include troubleshooting with predictive tests in which a number of tests are run and a prediction of problems is made.

There are many different tests which may be carried out to test for configuration issues. General tests that a configuration analyser tool may execute include testing if a machine on a network is up, testing if there is a firewall between two machines, checking to see if a port on a machine is open, and checking to see if a test file conforms to a specific regular expression (regex).

An example base set of tests provided in a configuration analyser tool may include:
  Check if the primary object server is up.
  Check if the rules and properties file exists.
  Check if a secondary object server is configured.
  Check if syntax checker is installed.
  Check if rules file is syntactically correct.
  Check if there is space for log files.
  Check if there is a failover probe configured.

The configuration analyser tool may also contain specific tests for each integration product.

For probes, tests can be included to check space for files, check port or socket is available to bind to, and check file syntax, check database connectivity, check Transmission Control Protocol (TCP) server availability, check User Datagram Protocol (UDP) port availability, and check system library version.

For example, the IBM Tivoli Event Integration Facility (EIF) is an event distribution and integration point for an event console. If the probe is an EIF probe, the following tests can be included:
  Check if there is space for EIF cache files.
  Check if EIF probe can bind to a port.

In another example, if there is a Multi-thread trapd (MT-Trapd) probe, the following tests can be included:
  Check gskit and libncrypt library versions.
  Test auth file syntax.
  Check socket is available to bind to.

If there is an Open Database Connectivity (ODBC), the following tests can be included:
  Check if ODBC.ini is setup correctly and is referenced by $ODBCINI (On Unix platforms) (Unix is a trade mark of The Open Group).
  Check if databases referenced in odbc.props exist.
  Check if tables and fields referenced in odbc.props exist.

An example test in Extensible Markup Language (XML) is as follows:

```
<task classref="FileExists" name="Rules file check"
description="This test will check to see if the rules file exists">
    <param name="fileName" value="%RulesFile" />
        <param name="passmsg" value="check.rules_pass">
            <insert value="%RulesFile" />
        </param>
        <param name="failmsg" value="check.rules_fail">
            <insert value="%RulesFile" />
        </param>
</task>
```

A "classref" attribute is used to look up the class that needs to be executed. "Params" are name value pairs passed to the test itself, with every test requiring at least a passmsg and failmsg param. Insert values are used to dynamically insert environment values (%) or probevalues ($) into output strings.

The use of the configuration analyser tool with probes is transparent since the launch script launches the tool if it finds a "-help" argument in the probe startup. To the user it looks like it is functionality that is built into the probe.

A configuration analyser tool and externalised test files may be provided as a service to a customer over a network.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc.

Other embodiments of the invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for testing configuration of environments, comprising:
  executing a probe for connection to a network, wherein the probe is external to the network;
  launching a configuration analyser tool from the probe, wherein the configuration analyser tool is launched prior to connection of the probe to the network;
  accessing one or more stored test files for the probe, each of the stored test files comprising one or more externally stored tests, and wherein each of the stored test files are associated with one or more of a plurality of suggestions files;

dynamically loading one or more of the externally stored tests at run time of the configuration analyser tool;

running, by the configuration analyser tool, a set of tests for the probe, the tests relating to connectivity and configuration of the network; and connecting the probe to the network in response to successful completion of the set of tests.

2. The method as claimed in claim 1, further comprising suggesting solutions to one or more test results.

3. The method as claimed in claim 1, further comprising:
storing one or more test results and one or more suggested solutions in a log file.

4. The method as claimed in claim in claim 1, further comprising:
providing a summary of tests run and one or more suggested solutions.

5. The method as claimed in claim 1, wherein each of the stored test files are further associated with one of a plurality of probe names.

6. The method as claimed in claim 1, further comprising:
checking the syntax of the one or more test files before running the set of tests.

7. The method as claimed in claim 1, wherein if running the set of tests results in a connectivity or configuration problem, the connection is aborted.

8. The method as claimed in claim 1, wherein the configuration analyser tool is transparent to an administrator.

9. The method as claimed in claim 1, wherein the method tests event management integration products.

10. The method as claimed in claim 1, wherein the set of tests is selected from the group consisting of testing if a server is working, testing if a firewall is in place between two machines, testing to see if a port is open on a machine, testing if rules and properties files exist, testing if rules and properties files are syntax correct, testing if a text file conforms to a regular expression, testing if a syntax checker installed, testing if there is space for a log file, and testing if a failover probe configured.

11. The method as claimed in claim 1, wherein the probe is an event management system probe for collecting enterprise-wide event information.

12. A computer program product for testing configuration of environments, the computer program product comprising:
a computer memory device;
computer program instructions operative to:
execute a probe for connection to a network, wherein the probe is external to the network;
launch a configuration analyser tool from the probe, wherein the configuration analyser tool is launched prior to connection of the probe to the network;
access one or more stored test files for the probe, each of the stored test files comprising one or more externally stored tests, and wherein each of the stored test files are associated with one or more of a plurality of suggestions files;
dynamically load one or more of the externally stored tests at run time of the configuration analyser tool;
run, by the configuration analyser tool, a set of tests for the probe, the tests relating to connectivity and configuration of the network; and
connect the probe to the network in response to successful completion of the set of tests;
wherein said program instructions are stored on said computer memory device.

13. The computer program product as claimed in claim 12, further comprising computer program instructions operative to suggest solutions to one or more test results.

14. The computer program product as claimed in claim 12, further comprising computer program instructions operative to:
store one or more test results and one or more suggested solutions in a log file.

15. The computer program product as claimed in claim 12, further comprising computer program instructions operative to:
provide a summary of tests run and one or more suggested solutions.

16. The computer program product as claimed in claim 12, wherein each of the stored test files are further associated with one of a plurality of probe names.

17. The computer program product as claimed in claim 12, further comprising computer program instructions operative to:
check the syntax of the one or more test files before running the set of tests.

18. The computer program product as claimed in claim 12, wherein if running the set of tests results in a connectivity or configuration problem, the connection is aborted.

19. The computer program product as claimed in claim 12, wherein the configuration analyser tool is transparent to an administrator.

20. The computer program product as claimed in claim 12, wherein the set of tests is selected from the group consisting of testing if a server is working, testing if a firewall is in place between two machines, testing to see if a port is open on a machine, testing if rules and properties files exist, testing if rules and properties files are syntax correct, testing if a text file conforms to a regular expression, testing if a syntax checker installed, testing if there is space for a log file, and testing if a failover probe configured.

21. The computer program product as claimed in claim 12, wherein the probe is an event management system probe for collecting enterprise-wide event information.

22. A system for testing configuration of environments, comprising:
a probe for connection to a network, wherein the probe is external to the network;
a configuration analyser tool launched from the probe, prior to connection of the probe to the network, the configuration analyser tool including:
a library storing one or more test files for the probe, wherein each of the stored test files comprises one or more externally stored tests, and wherein each of the stored test files are associated with one or more of a plurality of suggestions files;
a test loader component for dynamically loading one or more of the externally stored tests at run time of the configuration analyser tool; and
a test mechanism for running a set of tests for the probe, the tests relating to connectivity and configuration of the network, wherein the probe connection is aborted in response to one or more unsuccessful test results.

23. The system as claimed in claim 22, further comprising:
a log file for storing one or more test results and one or more suggested solutions.

24. The system as claimed in claim 22, further comprising:
wherein each of the stored test files are further associated with one of a plurality of probe names; and
wherein the test mechanism accessing the stored test files for the probe launching the configuration analyser tool.

* * * * *